(12) United States Patent
Colby et al.

(10) Patent No.: US 9,792,008 B2
(45) Date of Patent: Oct. 17, 2017

(54) USER INTERFACE WITH ANALYTICS OVERLAY

(71) Applicant: salesforce.com, inc., San Francisco, CA (US)

(72) Inventors: David J. Colby, San Francisco, CA (US); Eric Romero, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 87 days.

(21) Appl. No.: 14/571,841

(22) Filed: Dec. 16, 2014

(65) Prior Publication Data

US 2016/0171734 A1    Jun. 16, 2016

(51) Int. Cl.
*G06F 3/0484*     (2013.01)
*G06F 17/30*     (2006.01)
*G06T 11/20*     (2006.01)

(52) U.S. Cl.
CPC ...... *G06F 3/0484* (2013.01); *G06F 17/30554* (2013.01); *G06F 17/30864* (2013.01); *G06T 11/206* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |

(Continued)

*Primary Examiner* — James A Thompson (74) *Attorney, Agent, or Firm* — Lorenz & Kopf LLP (57) ABSTRACT

A method for displaying analytics data includes collecting, at an analytics database, analytics data comprising trackable events associated with operation of an application on a number of computing devices. The analytics data is received by a computing device. The analytics data is displayed on the first computing device during runtime of the application by superimposing upon a user interface of the application an analytics overlay including a graphical representation of the analytics data.

19 Claims, 6 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,029,121 B2 | 4/2006 | Edwards |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,760,910 B2 | 7/2010 | Johnson et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0163090 A1* | 7/2008 | Cortright ............ G06F 3/0481 715/771 |
| 2008/0249972 A1 | 10/2008 | Dillon |
| 2009/0063414 A1 | 3/2009 | White et al. |
| 2009/0100342 A1 | 4/2009 | Jakobson |
| 2009/0138427 A1* | 5/2009 | Kalavade ........... G06Q 10/0637 |
| 2009/0177744 A1 | 7/2009 | Marlow et al. |
| 2012/0233137 A1 | 9/2012 | Jakobson et al. |
| 2013/0169666 A1* | 7/2013 | Pacheco .................. G09G 5/02 345/594 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0263023 A1* | 10/2013 | Goodwin ............ G06F 3/0484 715/760 |
| 2015/0169587 A1* | 6/2015 | Silverman ........... G06F 17/3053 707/751 |
| 2015/0348107 A1* | 12/2015 | Wu .................... G06Q 30/0256 705/14.54 |

* cited by examiner

USER INTERFACE WITH ANALYTICS OVERLAY

TECHNICAL FIELD

Embodiments of the subject matter described herein relate generally to the presentation of analytics data associated with computer-implemented applications, and more particularly, to user interface systems and methods for providing such analytics data.

BACKGROUND

Developers and administrators often seek detailed "analytics data" specifying, in a quantitative manner, how various aspects of an application are being used by the end-user. Such analytics data—which typically track whether and to what extent certain buttons, links, and other user interface elements are used—may be provided in the form of an "analytics dashboard." An analytics dashboard typically displays a collection of charts, lists, and graphs representing data received from an analytics server, allowing the analyst (e.g., a developer or administrator) to select a data range based on time, application version, and the like.

While traditional "dashboard" user interfaces are effective in providing a detailed account of how a particular application is being used, it can be difficult for a developer to visualize, intuitively, the way that users are navigating through a particular application. For example, analytics data for a typical mobile app might include hundreds of "event labels" (e.g., "button1_click," "button2_click," etc.), but association between these event labels and elements of the actual application is often not clear when viewing such data in a traditional analytics dashboard. Furthermore, it can be challenging to view a dashboard user interface on mobile devices of the type having relatively small displays.

Accordingly, methods and systems are desired for improved user interfaces for displaying analytics data.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to application user interfaces that allow an authorized user (such as a developer or administrator) to view analytics data directly superimposed on the application user interface itself. When a user enters an "analytics mode" while running the application on a mobile device, a visual representation of the downloaded analytics data (e.g., a set of number, a heat-map, or the like) is displayed directly over the user interface. In this way, an intuitive and easy-to-use analytics user interface is provided.

In accordance with one embodiment, a method for displaying analytics data includes collecting, at an analytics database, analytics data comprising trackable events associated with operation of an application on a plurality of computing devices. The method further includes receiving, at a first computing device of the plurality of computing devices, the analytics data; and displaying the analytics data on the first computing device during runtime of the application by superimposing upon a user interface of the application an analytics overlay comprising a graphical representation of the analytics data.

In accordance with one embodiment, an analytics system includes an analytics database and a first computing device communicatively coupled to the analytics database via a network. The analytics database comprises analytics data including trackable events associated with operation of an application on a plurality of computing devices. The first computing device is configured to request, over the network, the analytics data from the analytics database, and to display the analytics data during runtime of the application by superimposing upon a user interface of the application an analytics overlay comprising a graphical representation of the analytics data.

Figure 1:
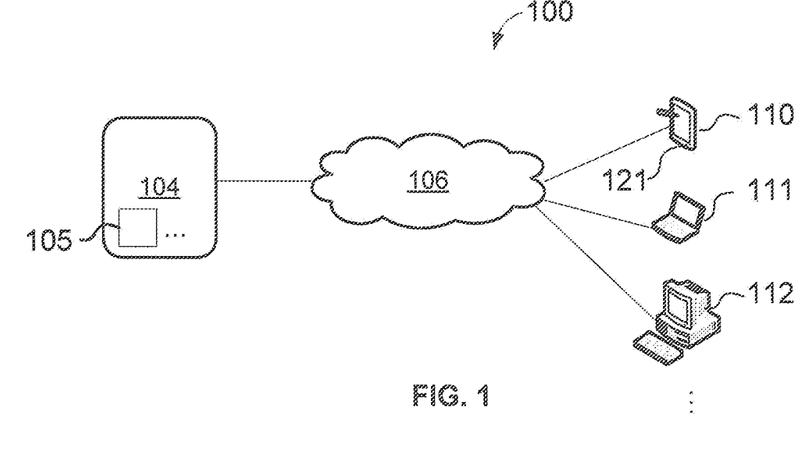
FIG. 1 is conceptual block diagram depicting a system and computing device in accordance with one embodiment.

Referring now to the conceptual block diagram depicted in FIG. 1, an analytics system 100 in accordance with one embodiment generally includes an analytics database 104 having one or more database objects 105 (or "analytics data") stored therein, and a plurality of computing devices (or simply "devices") 110, 111, 112, etc., communicatively coupled to analytics database 104 via, for example, a data communication network 106 (such as the Internet).

Analytics database (or "server") 104 may be implemented using any suitable combination of hardware and software and may correspond to any of a variety of database system types, including, for example, a multi-tenant system as described in further detail below in connection with FIG. 8. The range of embodiments are not so limited, however. Similarly, device 102 may include any combination of hardware and software configured to access analytics database 104 via network 106 and to provide a user interface (via a suitable display and input/output components) that allows a user to interact with various applications executable by devices 110, 111, and 112. Devices 110, 111, and 112 may correspond, for example, to a desktop computer, a laptop computer, a tablet computer, a smart-phone, or the like.

Analytics data 105 may include any combination of tables, schemas, and the like used to store and organize data within analytics database 104, as is known in the art. In accordance with the present subject matter, analytics data 105 includes trackable events, stored in any convenient data structure, that are associated with operation of a user interface provided by an application on devices 110, 111, and 112. In that regard, as used herein the term "trackable event" or simply "event" includes an action taken in an application, such as clicking a button or link, that is reported (via network 106) to analytics database 104. In some embodiments, information regarding the trackable events are accompanied by a key-value pair providing context for that action. Trackable events may be specified by the developer of the application using appropriate application programming interfaces (APIs). Such trackable events are not limited to the actuation of buttons and the like, however, and may include touch-screen gestures, accelerometer events, and any other user interface information generated by devices 110, 111, and 112. As used herein, the phrase "application user interface" refers to a user interface as experienced by a user during a normal operating mode—i.e., during "run-time" as that term is understood in the art.

Analytics data 105, as will be appreciated, is collected from multiple devices 110, 111, and 112 and may be associated with multiple applications. The analytics data 105 (or a subset of that data) is subsequently received by an individual device (such as device 1190). The request and subsequent receipt of analytics data 105 may be performed, for example, in response to a user initiating, via an actuatable component of the first computing device, an analytics mode of the first computing device. For example, if a particular application does not itself utilize a volume button or other mechanically actuatable component of device 110 (item 121 in FIG. 1), holding down the volume button may trigger a request for analytics data 105. A portion of the analytics data 105 may also be "pre-fetched" at predetermined intervals (which may be specified by the user) or at times when network 106 is available. The request of analytics data 105 may also be subject to authentication of the user as a user authorized to view such data, such as a developer of the subject application or an administrator associated with the subject application and/or analytics database 104.

As mentioned briefly above, the present subject matter relates to application user interfaces that an allow an authorized user (such as a developer or administrator) to view analytics data superimposed directly on the application user interface itself during runtime. This may be accomplished, as described in further detail below, by superimposing upon a user interface of the application an analytics overlay comprising a graphical representation of the analytics data.

Figure 2:
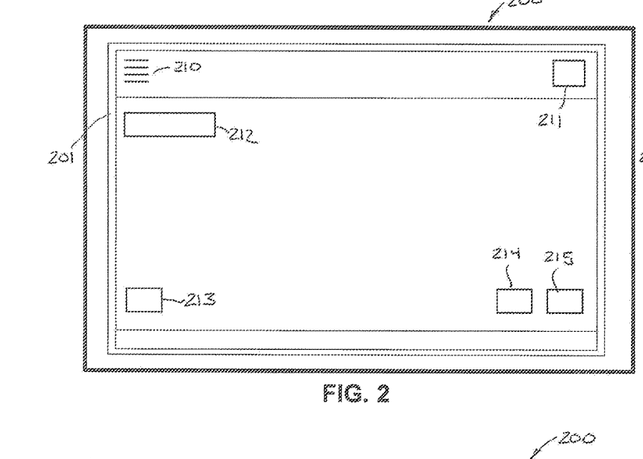
FIGS. 2-4 depict a user interface used to display analytics data in accordance with one embodiment.
Figure 3:
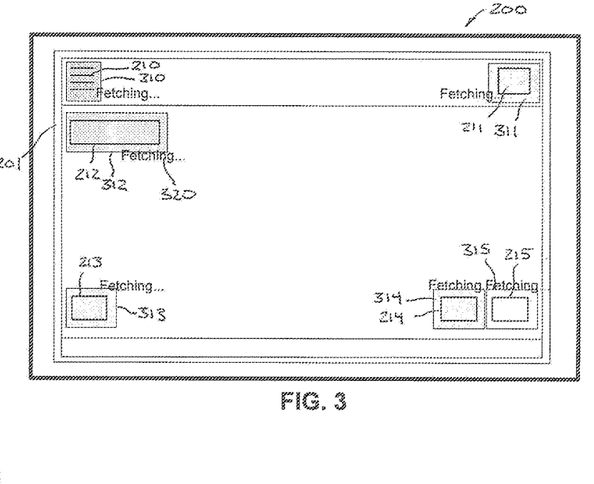

Referring now to FIGS. 2-3 in conjunction with FIG. 1, an example user interface in accordance with an exemplary embodiment will now be described. More particularly, FIG. 2 illustrates a display 200 (e.g., of device 110 of FIG. 1) including a user interface 201 of an application being operated during run-time (i.e., not in an analytics mode). In this mode, the user may interact with a variety of user interface elements (e.g., buttons, sliders, check-boxes, and the like) provided by user interface 201. In the illustrated embodiment, for example, user interface 201 includes six user interface elements (or simply "elements"): 210, 211, 212, 213, 214, and 215. It will be appreciated that the example shown in FIG. 2 is not intended to be limiting, and that a particular 201 may include any number of and any type of user interface element or elements.

It will be appreciated that not all user interface elements in a particular user interface 201 will generate a trackable event to be stored in analytics database 104. In that regard, the term "hot spot" is used herein to refer to any user interface element that triggers a trackable event when tapped or otherwise actuated.

FIG. 3 depicts the user interface 201 of FIG. 2 after initiation of an "analytics mode," as described above. That is, in response to user interaction with user interface 201 and/or a device 110 executing user interface 201, a request for analytics data 105 is initiated. As a result, the user interface changes to reflect the analytics mode. In the illustrated embodiment, for example, a text block (in this example, the phrase "Fetching") is used to indicate that analytics data 105 is being requested or "fetched." At the same time, the relevant "hot spots" (in this case, associated with elements 210-215) are highlighted to visually indicate the location of elements that are configured to trigger trackable events. Thus, in FIG. 3, highlight 310 is associated with element 210, highlight 311 is associated with element 211, and so on. It should be noted that during 'analytics mode' the app may be able to continue functioning as if in 'run time', e.g. buttons can be clicked or new screens can be entered.

In an alternate embodiment, analytics mode does not behave strictly the same as run-time. For example, in such an embodiment when the elements/hot spots are selected, the system might present a pop-up a dialog that contains additional information (such as the 'attributes' of the trackable action, etc.), or the system might launch a browser to a webpage that contains a more traditional analytics page (e.g., charts/graphs populated with data associated with that element). The functionality of analytics mode may include a "full mode" that shows all the analytics next to each area being measured, and a "partial mode" that can run at the same time the app is working live. The extent of such functionality may, in some embodiments, be configured by the user or administrator.

Figure 4:
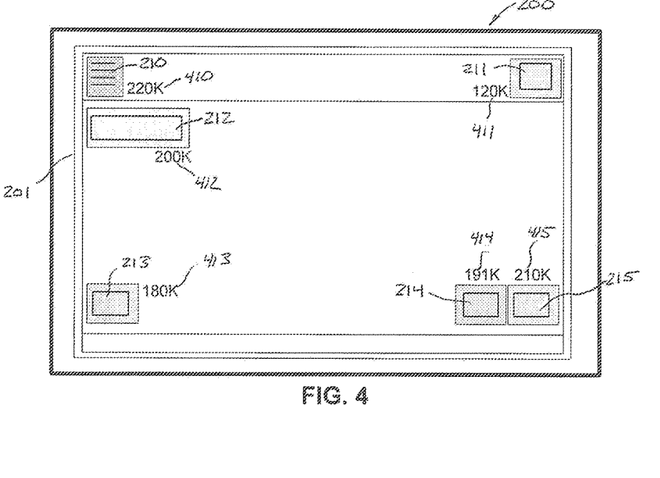

FIG. 4 depicts user interface 201 including an analytics overlay that includes a graphical representation of the analytics data 105. In this embodiment, the graphical representation includes, for each of the user interface elements 210-215, a visual cue (visual cues 410-415) indicating a quantitative measure of user interactions with the corresponding user interface element. In FIG. 4, for example, the visual cue is an absolute count of the user interactions within a certain time frame (which may be specified by the user). Thus, element 210 has been interacted with two-hundred and twenty-thousand times, element 211 has been interacted with one-hundred and twenty-thousand times, and so on. In an alternate embodiment, "spark lines," arrows, and/or other such graphics are used as visual cues to indicate what a user is doing over time in a particular area of the application.

Figure 5:
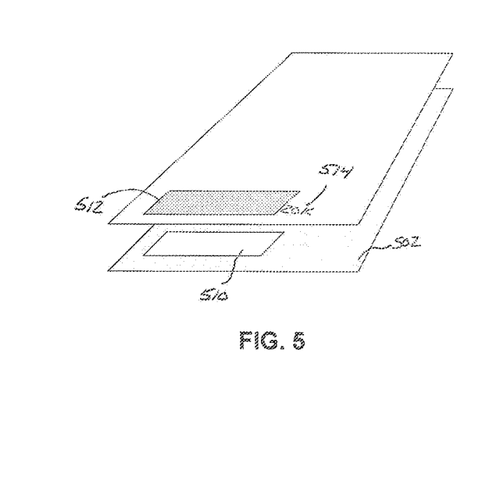
FIG. 5 illustrates multiple conceptual layers and an overlay in accordance with one embodiment.
Figure 6A:
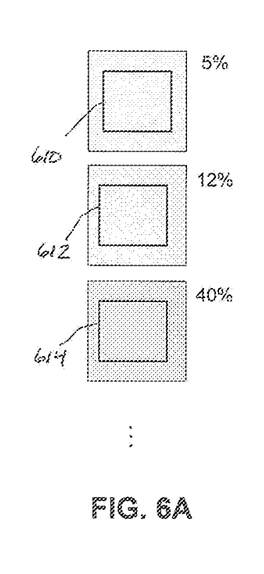
FIGS. 6A-6C depict example analytics overlays in accordance with various embodiments.
Figure 6B:
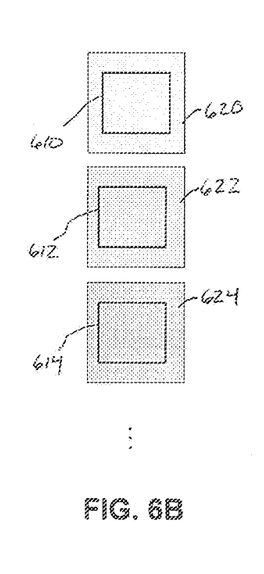
Figure 6C:
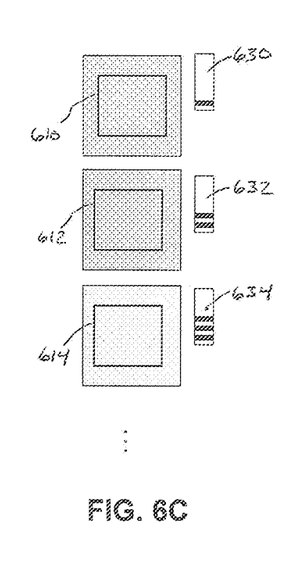

Other examples of visual cues are depicted in FIGS. 6A-6C. In FIG. 6A, for example, relative percentages of usage (5%, 12%, and 40%) are shown for respective elements 610, 612, and 614. In FIG. 6B, a "heat-map" is illustrated in which the color, hue, intensity, or the like is varied for the highlighting (620-624) associated with elements 610, 612, and 614, respectively. In FIG. 6C, bar graphs 630, 632, and 634 are shown, indicating relative usage of elements 610, 612, and 614. It will be appreciated that the examples shown in FIGS. 4 and 6A-6C are not intended to be limiting, and any type of visual cue may be used As mentioned above, the resulting user interface shown in FIG. 4 includes an "analytics overlay" or simply "overlay." As used herein, that term refers to a logical layer used to display highlighting and visual cues over the actual user interface used during runtime. This is shown conceptually in FIG. 5, which depicts a overlay 512 and visual cue 514 on a layer that is "above" the user interface layer 502, which includes an element 510. Overlay 512 may be implemented in a variety of ways, but need not be a separate, distinct pictorial layer in the graphical sense (e.g., as that term is used in connection with photo editing programs).

Figure 9:
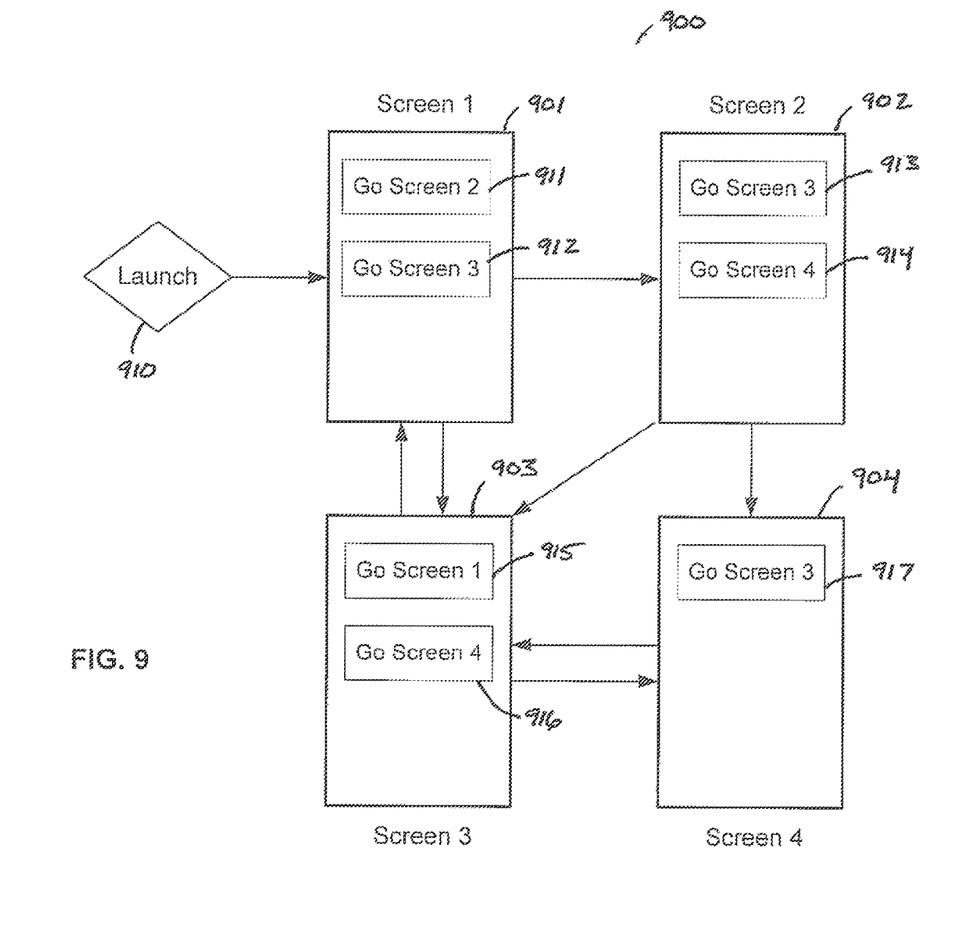
FIG. 9 is a conceptual block diagram depicting page tracking in accordance with one embodiment.

In a further embodiment, the graphical representation may a "page path" or "tracking" indicating a path or flow traversed by a user with respect to the user interface elements within user interface 201. Referring to the exemplary flow 900 depicted in FIG. 2, when a user launches (at step 910) the application, the user "lands" on screen 1 (901). In this embodiment, four screens (901-904) are shown, each having respective navigational user interface elements (911-

917). Thus, from screen 1 (901), the user interacts with user interface elements 911 and/or 912 to navigate, respectively, to Screen 2 (902) or Screen 3 (903). In analytics mode, after users land on screen 1 (901), they are segmented into two groups: some going to screen 2 (902), and the rest going to screen 3 (903). Once a user reaches screen 3 (903), he has the option of going back to screen 1 (901), or continuing to screen 4 (904). In analytics mode, the system can then show data responsive to a query, such as "given the users who have reached screen 3 from screen 1, how many have then gone back to screen 1 or moved to screen 4." Then on screen 4 (904), the analytics overlay could represent data such as "given the people who have navigated from screen 1→screen 3→screen 4, how many have gone back to screen 3," and so forth. Thereafter, the numbers shown on the analytics overlay would be different for the same screen, depending on how the user reached that screen (i.e., the 'path' that took them there). In other embodiments, "funnels" representing the paths that users take over time may also be used as a visual cue.

Figure 7:
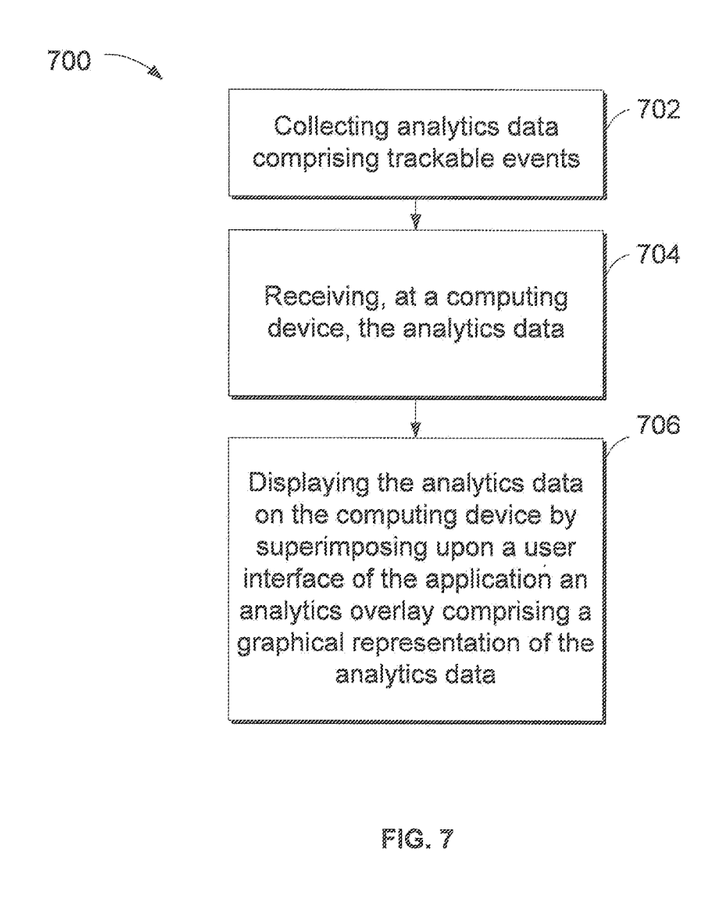
FIG. 7 is a flowchart illustrating a method in accordance with one embodiment.

Referring now to the exemplary flowchart 700 of FIG. 7 in conjunction with FIG. 1, a summary of the an exemplary method for providing an analytics user interface will now be described. Initially, at 702, analytics data comprising trackable events is collected at analytics database 104. As described above, this data is generated by the various applications running on devices 110, 111, and 112 and transmitted to database 104 via network 106. Next, at step 704, the analytics data 105 (or a relevant portion thereof) is received by a device, such as device 110. Finally, in step 706, the analytics data 105 is displayed on the computing device 110 by superimposing upon a user interface of the application an analytics overlay comprising a graphical representation of the analytics, as described above.

It will be appreciated that the analytics database and/or server 104 of FIG. 1 may be implemented in the context of a wide range of database architectures. Similarly, the particular application used to generate the trackable events may be stand-alone applications stored within the computing device (e.g., "apps" downloaded from an online store) or may be on-demand applications provided by an external server.

Figure 8:
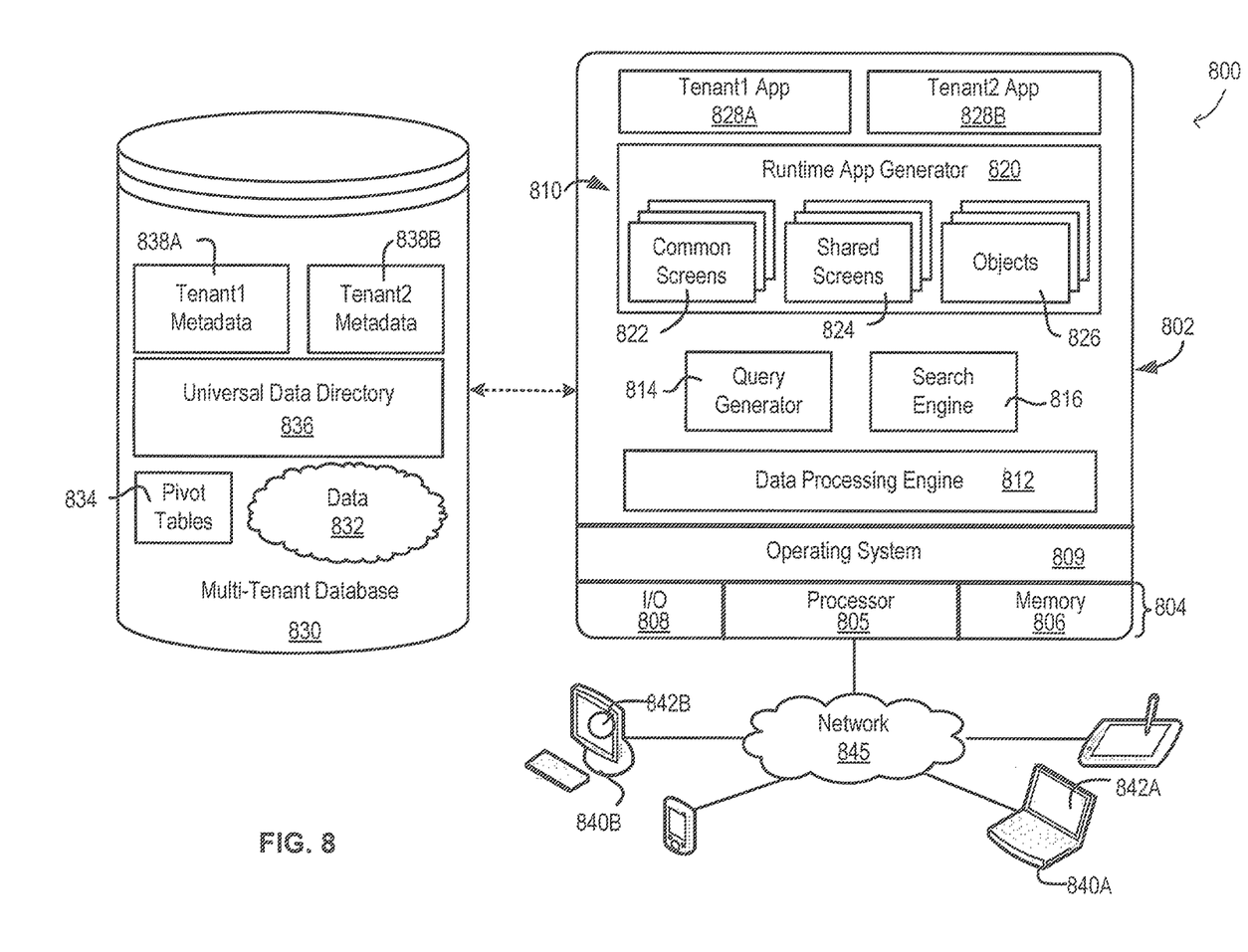
FIG. 8 is a conceptual block diagram of a multi-tenant system in accordance with one embodiment.

In that regard, FIG. 8 depicts an exemplary multi-tenant system suitable for implementation of the systems and methods described herein. That is, the various devices 804 may correspond to devices 110, 111, and/or 112 of FIG. 1, while analytics data 105 may be stored within multi-tenant database 830.

The multi-tenant system 800 of FIG. 8 includes a server 802 that dynamically creates and supports virtual applications 828 based upon data 832 from a common database 830 that is shared between multiple tenants, alternatively referred to herein as a multi-tenant database. Data and services generated by the virtual applications 828 are provided via a network 845 to any number of client devices 840, as desired. Each virtual application 828 is suitably generated at run-time (or on-demand) using a common application platform 810 that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 808 and the like. The input/output features 808 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 809. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to on-demand applications, console systems, user interfaces, web browsers, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

In summary, what has been described are improved systems and method for managing user interfaces, such as consoles or "control panels" associated with database systems, providing a user interface scheme in which certain components of the main workspace can be "popped-out" in such a way that they may be advantageously arranged by the user over one or more monitors. At the same time, operations performed on the main workspace are reflected in the appropriate pop-up window(s) and/or operations performed within the pop-up window(s) are reflected in the main workspace (and, optionally, other pop-up windows).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method for displaying analytics data at a user interface displayed on a display of a first mobile computing device, comprising:
   receiving, at the first mobile computing device of a plurality of mobile computing devices, analytics data comprising trackable events associated with operation of a mobile application on the plurality of mobile computing devices;
   rendering the user interface at the display of the first mobile computing device, the user interface comprising a plurality of user interface elements that trigger the trackable events when actuated; and
   displaying, in response to analytics mode being initiated, the analytics data on the first mobile computing device during runtime of the mobile application by superimposing an analytics overlay directly upon the user interface, the analytics overlay comprising: a plurality of distinct analytics overlay elements that are each simultaneously displayed overlying a distinct area of the user interface where a particular user interface element of the user interface is located, wherein each distinct analytics overlay element comprises: a visual cue that represents analytics data associated with that particular user interface element that visually indicates a quantitative measure of user interactions with a corresponding user interface element that the visual cue is associated with.

2. The method of claim 1, further including receiving the analytics data at the first mobile computing device in response to a user initiating, via an actuatable component of the first mobile computing device, the analytics mode of the first mobile computing device.

3. The method of claim 1, wherein the analytics data is pre-fetched from the analytics server and received at the first mobile computing device at predetermined intervals.

4. The method of claim 1, wherein each visual cue indicates user interactions in a particular distinct area of the user interface of the mobile application.

5. The method of claim 1, wherein each visual cue is expressed as a relative percentage of user interaction with a particular user interface element out of all the user interactions within a predetermined time-frame.

6. The method of claim 1, wherein the graphical representation is a heat-map, and each visual cue is a color associated with the user interactions.

7. The method of claim 1, wherein the user interface is a web-based user interface and the mobile application is a web-based mobile application executed by a browser provided by the first mobile computing device.

8. A non-transitory machine-readable medium including instructions for processing analytics data, which instructions, when executed by a processor, causes the processor to perform the steps of:
   requesting, from an analytics database remote from the processor, analytics data comprising trackable events associated with operation of a mobile application on a plurality of mobile computing devices; and
   displaying, in response to analytics mode being initiated, the analytics data on a first mobile computing device of the plurality of mobile computing devices during runtime of the mobile application by superimposing an analytics overlay upon a user interface of the mobile application that comprises a plurality of user interface elements that trigger the trackable events when actuated, the analytics overlay comprising: a plurality of distinct analytics overlay elements that are each simultaneously displayed overlying a distinct area of the user interface where a particular user interface element of the user interface is located, wherein each distinct analytics overlay element comprises: a visual cue that represents analytics data associated with that particular user interface element that visually indicates a quantitative measure of user interactions with a corresponding user interface element that the visual cue is associated with.

9. The non-transitory machine-readable medium of claim 8, wherein the instructions are further configured to cause the processor to request the analytics data in response to a user initiating, via an actuatable component of the first mobile computing device, the analytics mode of the first mobile computing device.

10. The non-transitory machine-readable medium of claim 8, wherein the instructions are further configured to cause the processor to pre-fetch the analytics data at predetermined intervals.

11. The non-transitory machine-readable medium of claim 10, wherein each visual cue indicates user interactions in a particular distinct area of the user interface of the mobile application.

12. The non-transitory machine-readable medium of claim 10, wherein each visual cue is expressed as a relative percentage of user interaction with a particular user interface element out of all the user interactions within a predetermined time-frame.

13. The non-transitory machine-readable medium of claim 10, wherein the graphical representation is a heat-map, and each visual cue is a color associated with the user interactions.

14. An analytics system comprising:
   an analytics database comprising analytics data including trackable events associated with operation of a mobile application on a plurality of mobile computing devices; and
   a first mobile computing device of the plurality of mobile computing devices, the first mobile computing device configured to request, over a network, the analytics data from the analytics database, and to display, in response to analytics mode being initiated, the analytics data during runtime of the mobile application by superimposing an analytics overlay directly upon a user interface of the mobile application that comprises a plurality of user interface elements that trigger the trackable events when actuated, the analytics overlay comprising: a plurality of distinct analytics overlay elements that are each simultaneously displayed overlying a distinct area of the user interface where a particular user interface element of the user interface is located, wherein each distinct analytics overlay element comprises: a visual cue that represents analytics data associated with that particular user interface element that visually indicates a quantitative measure of user interactions with a corresponding user interface element that the visual cue is associated with.

15. The system of claim 14, wherein the first mobile computing device is configured to receive the analytics data in response to a user initiating, via an actuatable component of the first mobile computing device, an analytics mode of the first mobile computing device.

16. The system of claim 14, wherein the analytics data is pre-fetched from the analytics database and received at the first mobile computing device at predetermined intervals.

17. The system of claim 14, wherein each visual cue indicates user interactions in a particular distinct area of the user interface of the mobile application.

18. The system of claim 14, wherein each visual cue is expressed as a relative percentage of user interaction with a particular user interface element out of all the user interactions within a predetermined time-frame.

19. The system of claim 14, wherein the graphical representation is a heat-map, and each visual cue is a color associated with the user interactions.

* * * * *